United States Patent
Berthelemy et al.

[11] Patent Number: 5,733,495
[45] Date of Patent: Mar. 31, 1998

[54] METHOD OF MAKING A DISC CONSISTING OF A SPIRALLY WOUND FIBRE

[75] Inventors: Jean-Claude Robert Berthelemy, Mennecy; Gérard Philippe Gauthier, St Michel s/Orge; Ludovic Edmond Camille Molliex, Paris; Alain Robert Yves Perroux, Ris Orangis, all of France

[73] Assignee: Societe Nationale d'Etude et de Construction de Moteurs d'Aviation "SNECMA", Paris, France

[21] Appl. No.: 719,655

[22] Filed: Sep. 25, 1996

[30] Foreign Application Priority Data

Sep. 27, 1995 [FR] France ................. 95 11302

[51] Int. Cl.$^6$ .................. B29C 53/56; B29C 53/00
[52] U.S. Cl. .............. 264/275; 264/29.1; 264/279.1; 264/313
[58] Field of Search ................ 264/279.1, 29.1, 264/322, 275, 277, 313, 320; 425/502, 518

[56] References Cited

U.S. PATENT DOCUMENTS

| | | | |
|---|---|---|---|
| 2,431,883 | 12/1947 | Morton . | |
| 3,396,450 | 8/1968 | Faehndrich et al. | 264/279.1 |
| 3,419,952 | 1/1969 | Carlson | 29/471.3 |
| 3,680,207 | 8/1972 | Belmonte et al. | 264/275 |
| 3,932,568 | 1/1976 | Watts et al. | 264/29.1 |
| 3,936,550 | 2/1976 | Carlson et al. | 428/294 |
| 4,217,157 | 8/1980 | Stoltze et al. | 156/87 |
| 4,697,324 | 10/1987 | Grant et al. | 29/419 |
| 5,431,984 | 7/1995 | Keck et al. | 428/175 |

FOREIGN PATENT DOCUMENTS

| | | |
|---|---|---|
| 2 523 650 | 9/1983 | France . |
| 2 533 499 | 3/1984 | France . |

OTHER PUBLICATIONS

Patent Abstracts of Japan, vol. 9, No. 215, (M–409), Sep. 3, 1985, JP-A-60 076238, Apr. 30, 1985.

*Primary Examiner*—Jan H. Silbaugh
*Assistant Examiner*—Mark Eashoo
*Attorney, Agent, or Firm*—Oblon, Spivak, McClelland, Maier & Neustadt, P.C.

[57] ABSTRACT

A blank consisting of a spirally wound fiber for use in the manufacture of a fiber reinforced article of composite material is made by winding the fiber onto a helical track on the surface of a frusto-conical spindle, covering the wound fiber with a thermoplastic binder which sets to form a frusto-conical shell encasing the fiber, removing the shell from the spindle and placing the shell with its base on a plate, and heating the shell starting from its base so as to soften it and cause it to progressively collapse onto the plate to form a disc comprising a spirally wound fiber. If necessary the collapse of the shell may be assisted by pressing on the shell in a direction towards the plate.

7 Claims, 2 Drawing Sheets

METHOD OF MAKING A DISC CONSISTING OF A SPIRALLY WOUND FIBRE

BACKGROUND OF THE INVENTION

1. Field of the Invention

The present invention relates to a method of making a blank consisting of a spirally wound fibre, for use in particular in the manufacture of rings made of composite material in which the fibre provides the mechanical strength.

2. Summary of the Prior Art

In processes in which the rings are formed by hot isostatic pressing, no particular direction for the fibre is imposed, but special tooling and precise implementation are required. Processes involving consolidating the ring by pressing along the axis of the ring are easier to implement, but it is accepted that the fibres must be disposed with more order and regularity, and that they have to be wound into spirals which are superimposed depending on the ring thickness required. However, producing these fibre windings is difficult.

It has been proposed to place a metallic strip next to the fibre, and to wind both the fibre and the strip at the same time so that the strip acts as a spacer for the consecutive turns of the fibre. It has also been proposed to machine a disc electrochemically to form a spiral groove in the disc into which the fibre is placed. However, both of these processes involve the presence of a spacing member, which makes manufacture appreciably more costly, and there is therefore a need for a simpler method of making a blank consisting of a spirally wound fibre.

SUMMARY OF THE INVENTION

The invention proposes to solve this problem by winding the fibre on a truncated cone, and then flattening or crushing the frusto-conical helical winding obtained to convert it into a spiral winding. Contrary to what one might believe, these two essential steps can be carried out easily and with good quality results.

More precisely, the invention provides a method of making a blank consisting of a spirally wound fibre, comprising the steps of:

providing a frusto-conical spindle having a helical track on the surface thereof;

winding a fibre on to said helical track on said spindle;

pouring a thermoplastic binder in the liquid state over said fibre wound on said helical track and allowing said binder to set to form a frusto-conical shell encasing said fibre;

removing said shell from said spindle and placing said shell on a plate so that the base of said frusto-conical shell rests on said plate; and, locally heating said shell commencing around said base thereof so as to soften it and cause it to collapse progressively onto said plate, thereby converting said frusto-conical shell into a disc on said plate.

If necessary, a force may be exerted on the shell in a direction towards the plate during the heating of the shell in order to assist its collapse onto the plate to form the disc.

The binder used may be a pyrolysable material, so that it can be eliminated easily by heating after the spiral winding of the fibre has been obtained.

It may also be advantageous to cool the plate while the frusto-conical shell is being heated, so that as the shell collapses onto the plate it immediately becomes rigid again in the flat state and thereby holds the spiral winding securely in position.

Removal of the frusto-conical shell from the spindle may be facilitated if the spindle comprises an outer sleeve on which the helical track is formed, and a removable inner structure supporting the sleeve. This supporting structure may in fact be a sleeve expansion structure, the sleeve being made of an elastic material which contracts when the structure has been withdrawn to ensure the separation of the sleeve from the frusto-conical shell. Alternatively, the sleeve may be made of a thermoplastic material which loses its rigidity at a temperature lower than that at which the conical shell softens. This makes it possible to withdraw the sleeve from the shell by peeling it away following a light warming of the sleeve.

Further preferred features of the invention will become apparent from the following description of the preferred embodiment, given by way of example only, with reference to the accompanying drawings.

DESCRIPTION OF THE PREFERRED EMBODIMENT

Figure 1:
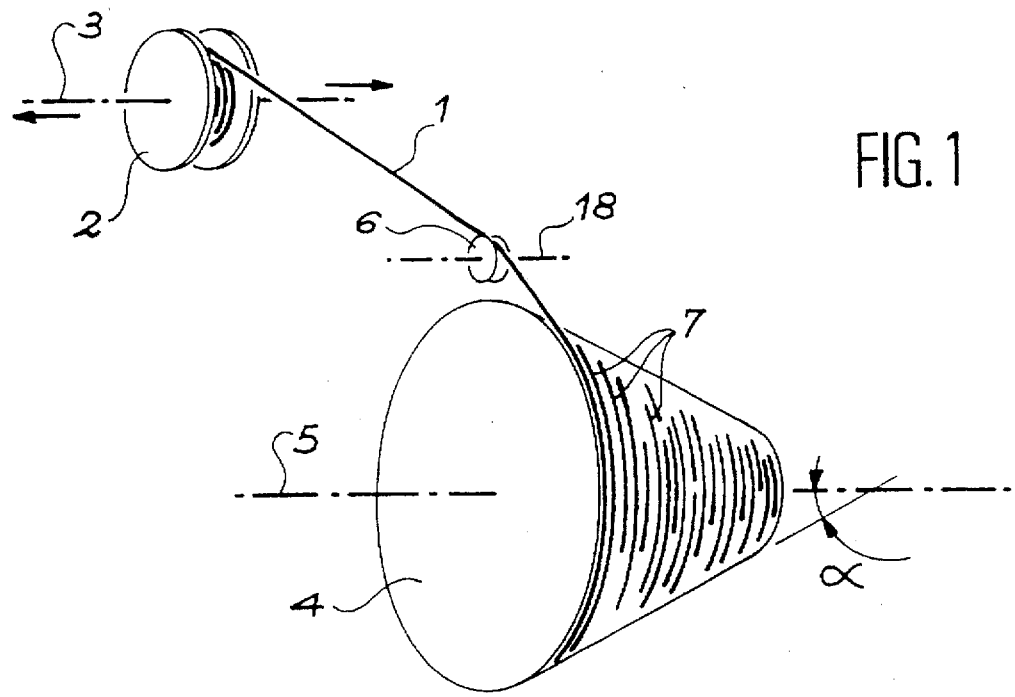
FIG. 1 illustrates diagrammatically the winding of a fibre on a frusto-conical spindle.

A silicon-carbide-based fibre 1 is, as shown in FIG. 1, dispensed from a reel 2 rotatably mounted on an axle 3, and helically wound on a frusto-conical spindle 4 mounted on a rotating shaft 5 parallel to the axle 3. The travel of the fibre 1 may be improved if use is made of a pilot reel 6 over which it passes and which is movable along another axle 18 parallel to the shaft 5. A control arrangement, not shown, governs both the translation of the pilot reel 6 along its axle 18 and the rotation of the shaft 5 and spindle 4 according to a fixed relationship so that the fibre 1 is wound on the spindle 4 forming turns 7 of different diameters but at a constant pitch.

Figure 2:
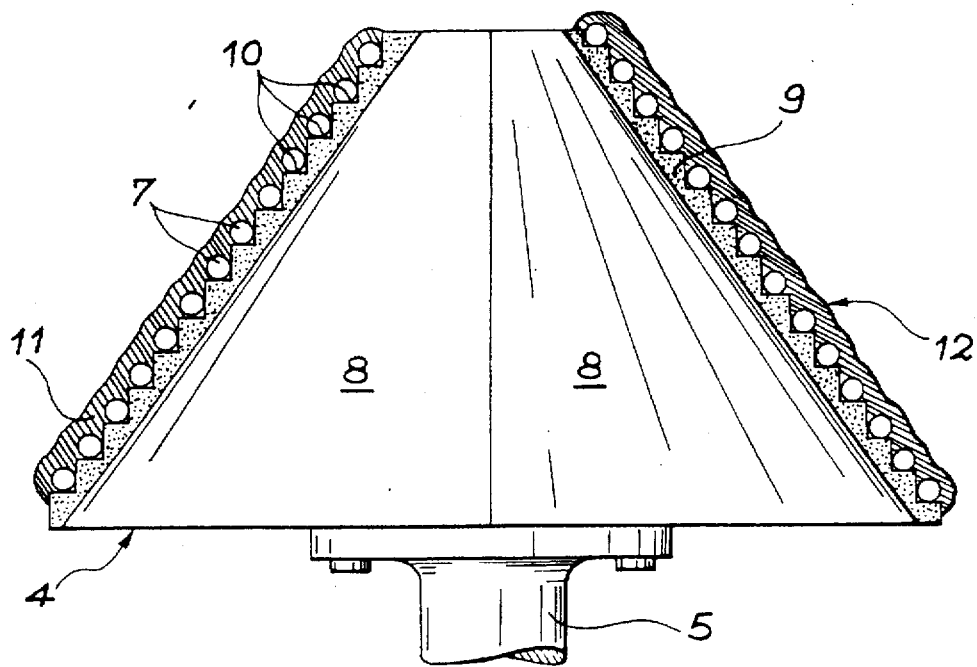
FIG. 2 is a part elevational, part sectional view of the spindle and a fibre wound and coated thereon.
Figure 3:
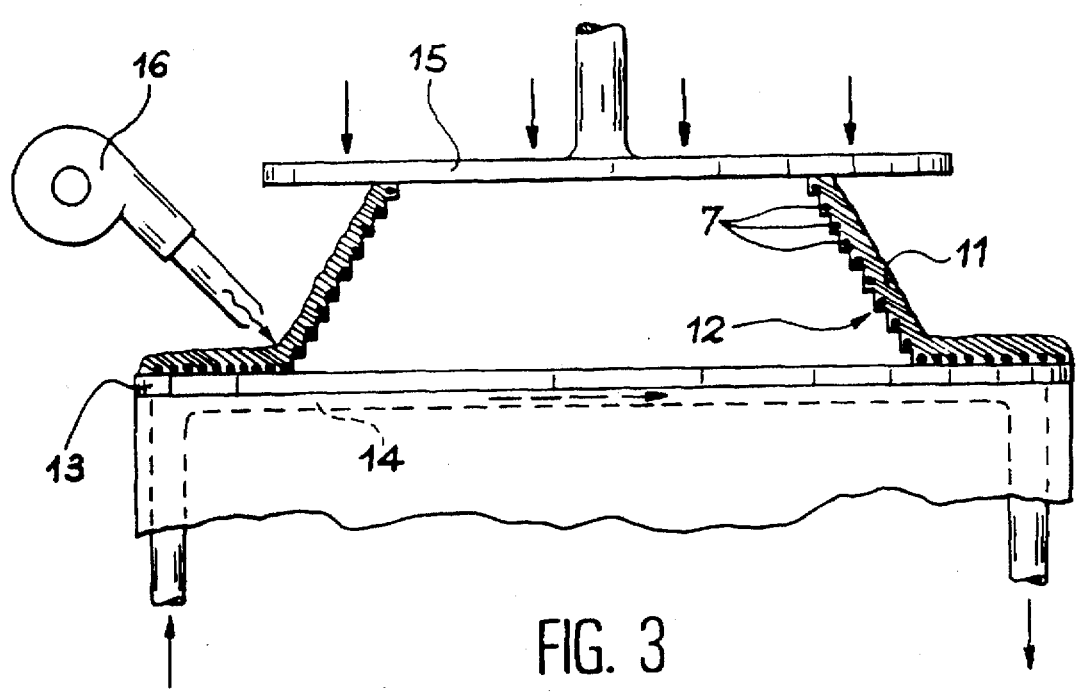
FIG. 3 illustrates the collapsing of the frusto-conical shell carrying the helically wound fibre on to a plate to form a disc; and, FIG. 4 shows the resulting disc containing the fibre as a spiral winding.

As shown in FIG. 2, the spindle 4 is formed by frusto-conical sector blocks 8 which are placed next to one another, and a resilient sleeve 9 which caps the blocks 8, being forced over the assembled blocks so as to be expanded in diameter. The sleeve 9 has a smooth conical inner face, the diverging angle of which is equal to that of the assembled blocks 8, but a stepped outer face defining a helical track 10 on which the turns 7 are laid. This arrangement protects against any accidental displacement of the turns 7 and provides for the desired pitch between them. The sleeve 9 may be made of polytetrafluoroethylene or any other suitable polymer, and may be a thermoplastic material.

The next step consists of pouring a binding agent onto the turns 7 to form a matrix 11 which covers them completely and which holds them in place once it has set. The binding agent may be thermoplastic polymethyl methacrylate ($CH_2C$ ($CH_3$) ($CO_2CH_3$)—)$_n$, initially mixed with a solvent which reduces it to a liquid state. After the liquid binding agent has been poured, the solvent evaporates naturally or by heating, allowing the binder to set to form a frusto-conical shell 12 carrying the helically wound fibre.

Next, the shell 12 comprising the fibre turns 7 and the binder matrix 11 is removed from the spindle 4. For this purpose, the spindle 4 is disconnected form the shaft 5, and the blocks 8 are removed. The sleeve 9 then contracts and falls away from the shell 12.

Figure 4:
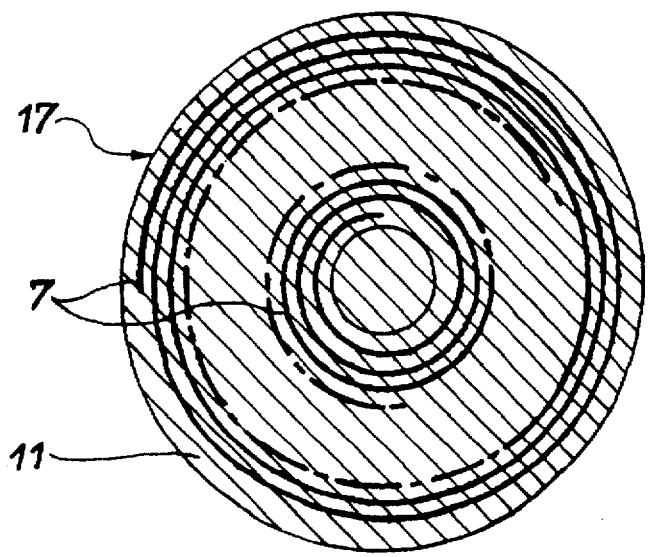

The frusto-conical shell 12 is then laid on a baseplate 13, which may be made of copper and is preferably cooled by a water circulation chamber 14 situated beneath it. As shown, the shell 12 is pressed towards the baseplate 13 by a press 15 so that, when softened as described below, the shell collapses and becomes flattened on the plate 13. Softening of the matrix 11 of the shell 12 is easy to effect if the binder is thermoplastic. The portion of the shell 12 at its base in contact with the plate 13 is heated to soften it and cause the shell to collapse progressively onto the surface of the baseplate 13. This heating may be effecting by a rotating laser, or a hot air blower (shown here at 16), or a heated spatula moved over the conical shell 12. Whichever method is used, the conical shell 12 gradually deforms into a cake or disc 17, as shown in FIG. 4, and the helically wound fibre becomes a flat spiral. The cooling of the baseplate 13 ensures that the matrix 11 sets again immediately after it has softened and deformed onto the plate under the action of the heat and pressure applied by the heater 16 and the press 15, thereby preventing subsequent accidental displacement of the fibre turns 7 in any other direction.

The final stage in the production of a ring using discs produced as just described consists of stacking the discs or cakes 17, possibly with thin spacer sheets interposed between them, then decomposing the matrix 11 of the discs by pyrolysis so that only the wound fibres remain, and, finally, coating the stack of spirally wound fibres with the material which is to constitute the matrix of the composite material. The pyrolysis of the polymethyl methacrylate binder matrix is achieved by heating it to 500° C. for two hours in a flow of neutral gas at 10 hPa. Loading is applied to the stack of discs to prevent the fibre turns becoming displaced by sliding. Decomposition is faster if the shell 12 is perforated to facilitate degassing.

The simplicity of the operations in the method of the invention as described above, and of the equipment used, will be readily appreciated. It should be added that in order to adjust the pitch of the turns 7 in the disc 17 it will be sufficient to replace the spindle 4 by another with a different cone angle. The same result may be achieved by altering the pitch of the track 10.

It is not necessary to stretch an elastic sleeve 9 over the blocks 8 in order to be able to separate it from the conical shell 12. If, for example, it is made of a thermoplastic material, it will suffice to heat it to a temperature at which it softens while the matrix 11 remains rigid, and then to peel the sleeve away from the shell.

The binder may also be mixed with a powdered material which will be used to form the matrix of the final composite material. The powdered material will then be held by the binder in the discs until pyrolysis is carried out to destroy the binder and leave the powdered material in position for subsequently forming the composite material.

We claim:

1. A method of making a disc consisting of a spirally wound fibre, comprising the steps of:

providing a frusto-conical spindle having a helical track on a surface thereof;

winding a fibre on to said helical track on said frusto-conical spindle;

pouring a thermoplastic binder in a liquid state over said fibre wound on said helical track and allowing said thermoplastic binder to set, thereby forming a frusto-conical shell encasing said fibre, said frusto-conical shell having a base;

removing said frusto-conical shell from said spindle and placing said frusto-conical shell on a plate so that said base of said frusto-conical shell rests on said plate;

locally heating said frusto-conical shell commencing around said base thereof so as to soften said frusto-conical shell; and causing said frusto-conical shell to collapse progressively onto said plate, thereby converting said frusto-conical shell into said disc on said plate.

2. The method according to claim 1, further comprising the step of exerting a force on said frusto-conical shell in a direction towards said plate during said step of heating said frusto-conical shell.

3. The method according to claim 1, further comprising the step of cooling said plate during the heating of said frusto-conical shell.

4. The method according to claim 1, wherein said binder is a pyrolyzable material.

5. The method according to claim 1, wherein said spindle comprises an outer sleeve on which said helical track is formed, and a removable inner structure for supporting said outer sleeve.

6. The method according to claim 5, wherein said outer sleeve is a thermoplastic.

7. The method according to claim 5, wherein said outer sleeve is elastic and expanded by the inner supporting structure.

* * * * *